United States Patent [19]

White et al.

[11] Patent Number: 5,203,522

[45] Date of Patent: Apr. 20, 1993

[54] RESEALABLE PROTECTIVE BOOT

[75] Inventors: Kevin A. White, Shelton; Robert F. Bohm, Bridgeport, both of Conn.

[73] Assignee: United Technologies Corporation, Hartford, Conn.

[21] Appl. No.: 725,140

[22] Filed: Jul. 3, 1991

[51] Int. Cl.⁵ .............................................. B64C 27/00
[52] U.S. Cl. ............................... 244/17.11; 244/129.1; 138/156; 138/110; 138/128; 428/100; 277/212 FB
[58] Field of Search ............... 138/167, 156, 110, 128, 138/103, 149; 428/100; 137/375; 244/17.11, 131, 129.1, 1 R; 277/212 FB

[56] References Cited

U.S. PATENT DOCUMENTS

| | | | |
|---|---|---|---|
| 2,585,054 | 2/1952 | Stachura | 138/128 |
| 4,142,565 | 2/1979 | Plunkett, Sr. | 138/149 |
| 4,518,017 | 5/1985 | Hannon et al. | 138/110 |
| 4,813,913 | 3/1989 | Belter | 277/212 FB |
| 4,985,942 | 1/1991 | Shaw | 138/110 |
| 5,015,215 | 5/1991 | Uchida | 277/212 FB |

Primary Examiner—Sherman D. Basinger
Assistant Examiner—Christopher P. Ellis

[57] ABSTRACT

An improved flexible boot 20 is provided for protecting aircraft operating mechanisms such as bearing 18 from foreign objects such as sand and dirt. The boot 20 has a slit 30 and an associated resealing arrangement 39 which allows the slit 30 to be resealably closed. The resealing arrangement 39 thus enables the protected mechanism or bearing 18 to be inspected without removal of, or damage to, the boot 20 while still allowing the boot to retain its ability to protect the bearing 18 from foreign object damage. The preferred resealing arrangement 39 is of the hook and loop type which is sold under the registered trademark Velcro ®.

4 Claims, 3 Drawing Sheets

RESEALABLE PROTECTIVE BOOT

TECHNICAL FIELD

This invention relates to flexible structures for foreign object damage protection, and more particularly to a resealable flexible boot structure for preventing foreign objects such as sand from infiltrating aircraft operating mechanisms including critical control components.

BACKGROUND ART

Flexible boots are commonly employed in aircraft and automobiles for protecting bearings from foreign object damage (e.g., dust and sand), thereby extending their useful life. Control rod bearings are particularly critical in rotorcraft since rotor blade pitch is dependent upon the integrity of such bearings. Beyond the requirement for providing protection there is a need for periodic inspection of critical bearing components to determine the extent of wear. These inspections are typically done by manually inserting a feeler gauge between the bearing liners to determine if the bearings have worn excessively and are in need of replacement. A problem with this procedure, however, is that it requires that the protective boot be removed or destroyed for proper inspection. Replacement of the boot, regardless of whether the bearing needs replacement or not, entails the disassembly of the control rod. Such disassembly is time consuming, costly, and results in undesirable aircraft down time.

DISCLOSURE OF INVENTION

It is a principal object of the present invention to provide a protective boot structure which facilitates periodic inspection of a protected component.

According to the invention, a flexible protective boot structure has a slit which permits the boot to be opened and is of sufficient size to permit inspection of the protected component by moving the boot to either side of the slit, while also providing a means for resealing the slit in a manner which allows the boot to retain its ability to protect critical components from foreign object damage.

This invention has the further benefit of being easier to install than conventional protective boots because the boot need not be stretched over the bearing to position it properly. The improved boot may simply be opened to fit over the bearing, and then sealed or resealed after it is in position. This feature may in turn reduce installation and maintenance costs as well as reduce the instances of boot tearing during installation and/or removal, thereby lowering boot failure rates.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
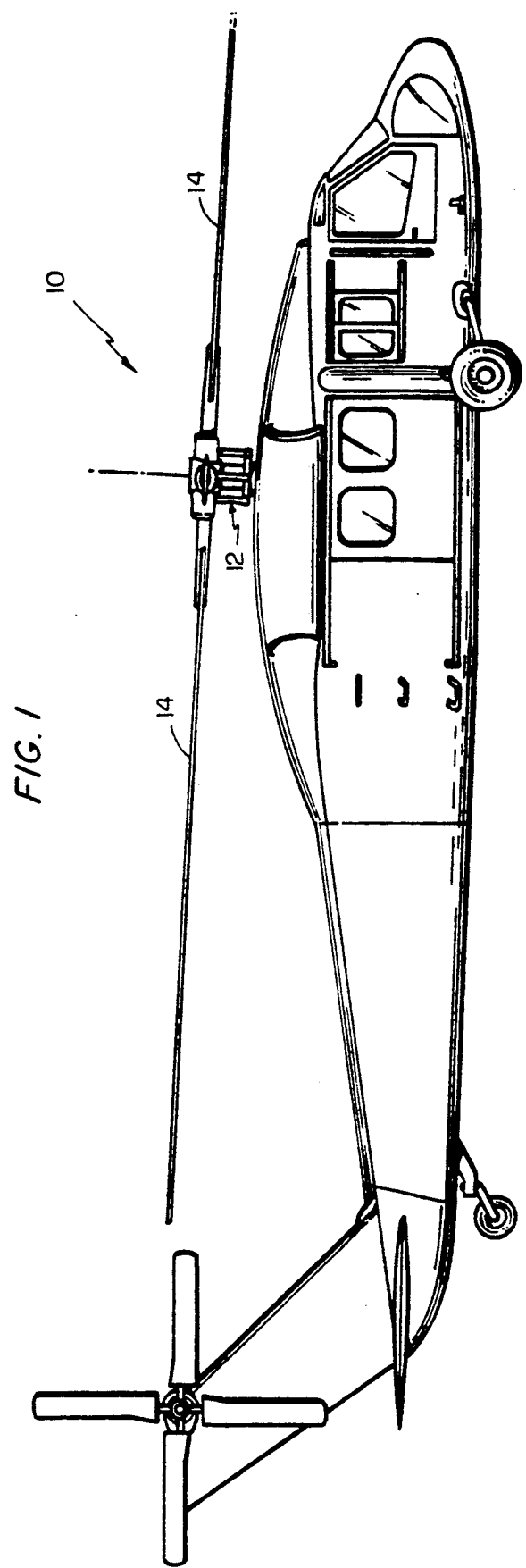
FIG. 1 is an elevational view of a helicopter on which the invention may be used.
Figure 2:
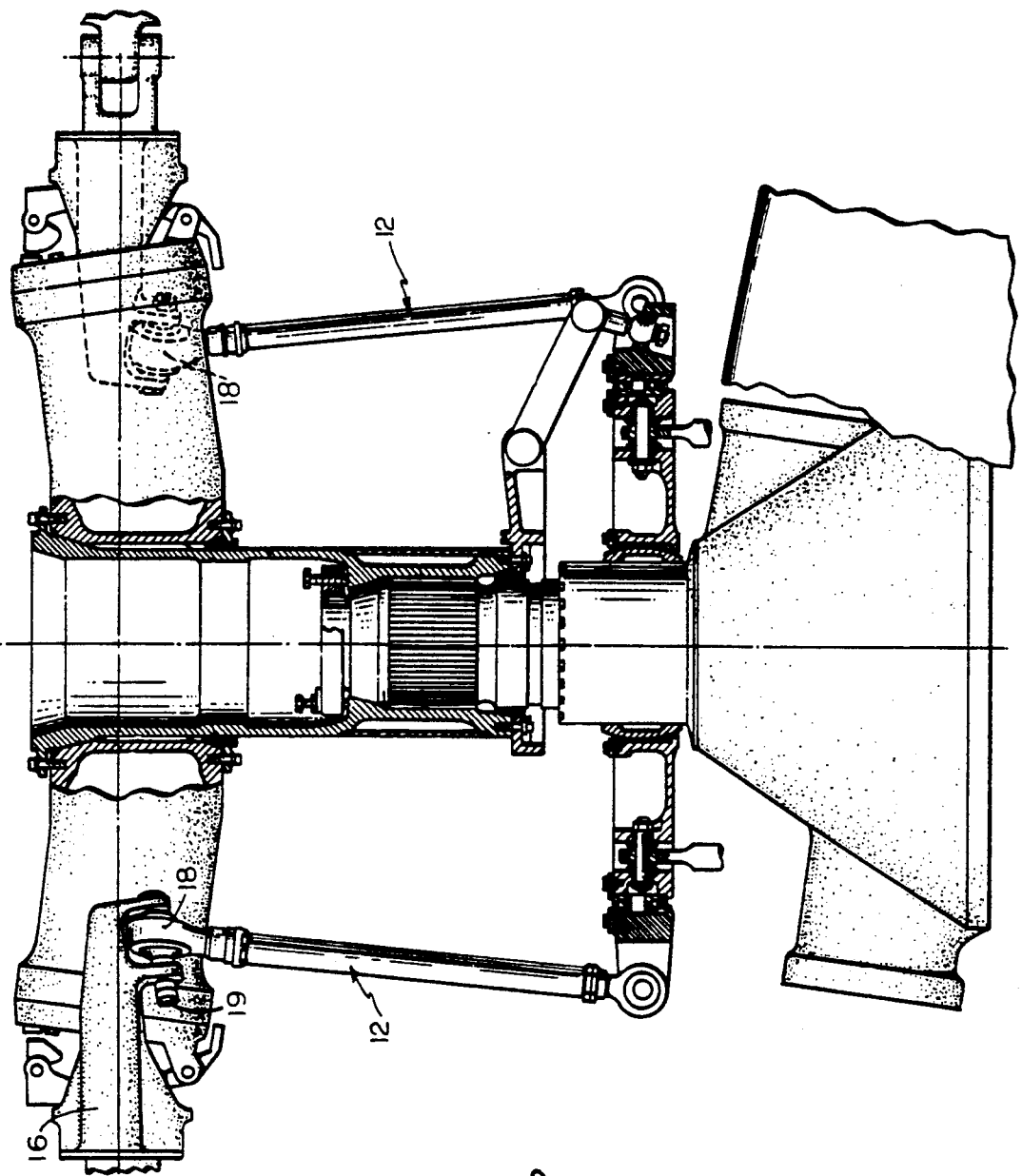
FIG. 2 is an elevational view of a portion of the helicopter of FIG. 1 showing the control rod bearings that the boot is designed to protect.

Referring to FIG. 1, helicopter 10 has control rods 12 which determine the pitch of rotor blades 14. In FIG. 2, each control rod 12 is fastened to a blade pitch horn 16 by means of a control rod bearing 18 and upper control rod attachment bolt 19, which horn is in turn connected to rotor blade 14.

Figure 3:
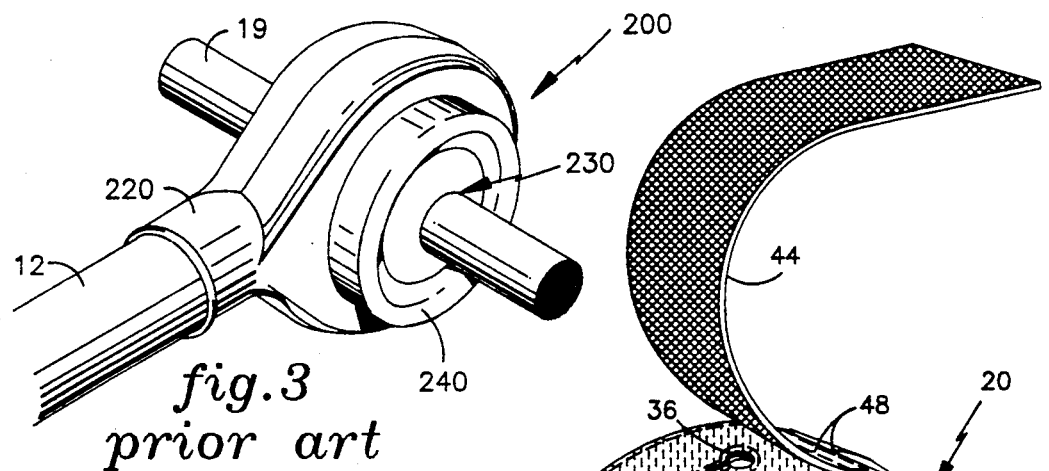
FIG. 3 is a perspective view of a prior protective boot shown in position over the upper control rod shaft and the upper control rod attachment bolt depicted in FIG. 2.

A protective boot 200 as shown in FIG. 3 has been conventionally used to protect bearing 18 from foreign objects such as dirt and sand. The boot 200 is shown in position over bearing 18 with control rod 12 extending from a neck portion 220 and the upper control rod attachment bolt 19 protruding from bolt holes 230 located on either side of a disk-like portion 240. The boot 200 was installed or removed by stretching it over the bearing 18, a process that frequently resulted in tearing the boot, thereby reducing the boot's useful life.

Figure 4:
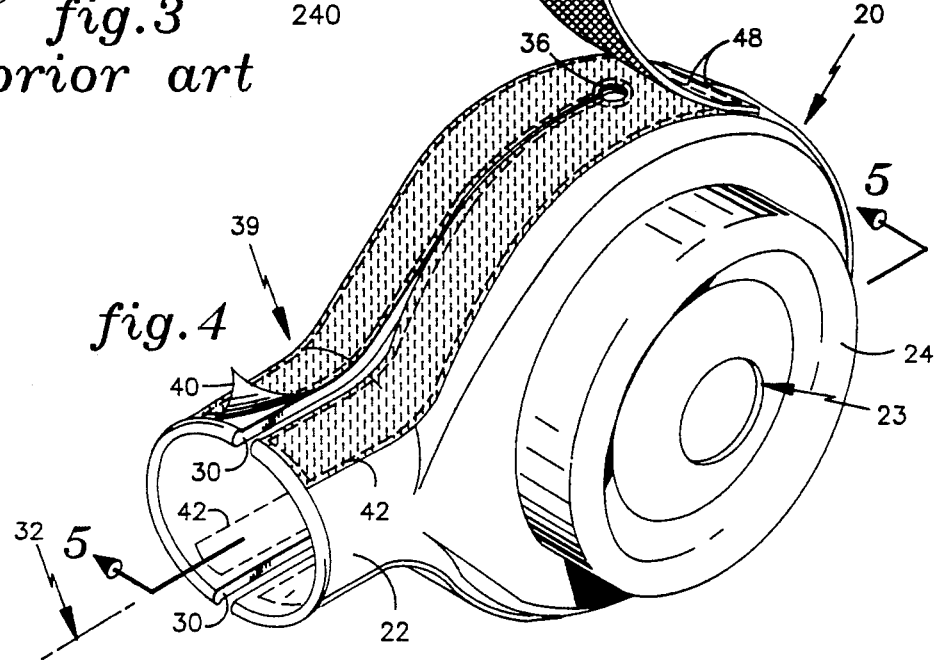
FIG. 4 is a perspective view of a protective boot with a slit, the boot shown in the initial stages of opening for inspection of the underlying components, and an associated resealing arrangement in accordance with the invention.
Figure 5:
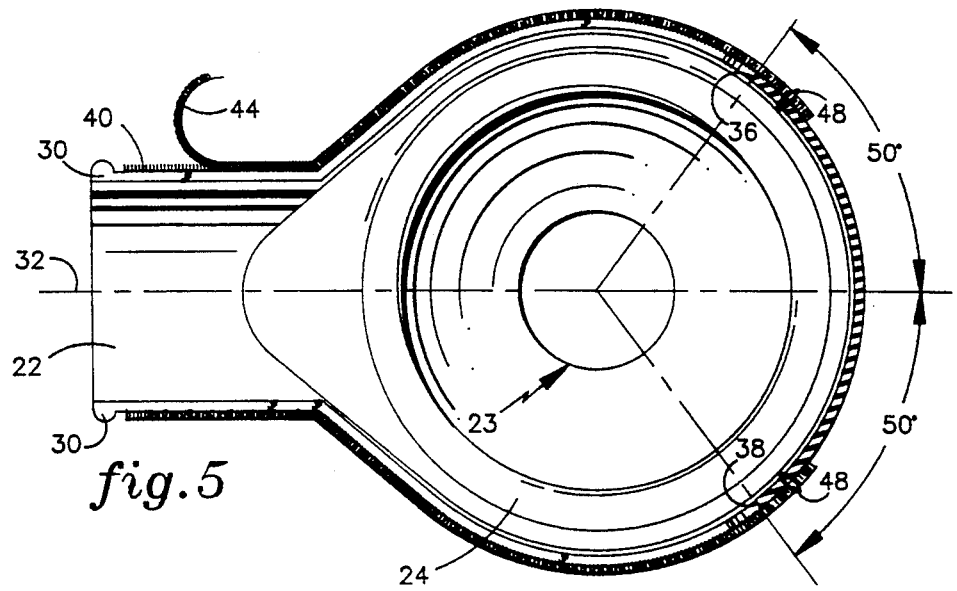
FIG. 5 is a sectional view of the resealable boot taken on the line 5—5 in FIG. 4.

Referring to FIG. 4, the boot 20 of the present invention is in most respects similar or identical to boot 200. The boot 20 has a neck portion 22 and a disk-like portion 24. In accordance with the invention, two longitudinal slits 30 break the surfaces of opposite sides of the boot 20, surfaces which are defined as including opposite sides of a circumference of the disk-like portion 24 and extending continuously therefrom into the neck portion 22. The slits are long enough to simplify the installation of the boot and also allow inspection of the protected components. The full length of each slit 30 is shown in FIG. 5, extending from a lip or outermost end of the neck portion 22 passing longitudinally through the neck portion 22 and continuing substantially around the circumference of the disk portion 24 to points 36 and 38 on boot 20 which are approximately 50 degrees to each side of centerline 32 respectively, with the origin of the angles taken as the center of the bolt holes 23. A convenient way to provide the slits 30 is to cut or similarly divide in a controlled manner the continuous surfaces of boot 10. At the inner end of the slits 30, at points 36 and 38, a hole punch is used to make a small circular cut approximately ⅛ inch in diameter in the boot 20 which serves as a rip-stop to keep the boot 20 from tearing. Although there are two slits, only one slit will be further described, and it should be understood that the description thereof and any means operatively associated therewith apply equally to the other slit.

Returning to FIG. 4, a resealing arrangement 39 is provided for resealably closing slit 30. The preferred resealing arrangement 39 is of the hook and loop type which is sold under the registered trademark Velcro ®. A fixed "hook" portion 40 approximately one inch wide and ½ inch longer than boot slit 30 has a longitudinal slit 41 which is of similar dimensions as boot slit 30, the slit 41 dividing the hook portion along its centerline. Hook portion 40 is positioned on boot 20 such that slit 41 aligns with slit 30. The hook portion 40 is initially secured to the boot 20 using any suitable and commonly used adhesive. The adhesive serves the preliminary purpose of properly positioning the hook portion 40 while it is more permanently fastened to the boot 20 with stitching 42. A one inch wide removable "loop" portion 44 is then laid over the hook portion 40 to reseal the opening at slit 30.

Referring to FIG. 5, the loop portion 44 is fastened to the boot 20 by means of stitching 48 at points just inward of the slit end points 36 and 38, allowing it to be peeled back to expose the slits 30 and 41 and open the boot 20, while remaining securely fastened to the boot 20. The hook and loop portions 40 and 44 respectively, enable the bearing 18 to be inspected without removal of, or damage to, the boot 20 while still allowing the boot to retain its ability to protect the bearing 18 from foreign object damage.

An important facet of this invention is to allow the protective boot to be opened and resealed without requiring the disassembly or removal of the protected elements. Although it is desirable to fasten the hook portion of the hook and loop fastener to the boot and apply the loop portion over the hook because of the loop portion's slightly greater flexibility, it is permissible to reverse the portions and stitch the loop portion to the boot, applying the hook portion over the loop to seal the opening, with nearly the same results. Further, although the hook and loop type fastener is a preferred arrangement for resealing the boot, the invention is not limited to this configuration. Other means for resealing the boot may comprise plastic snaps, plastic zippers, "zip-lock" type zippers, or any other arrangement that allows the boot to be resealed. Furthermore, the invention may be practiced with any number of slits in a protective boot.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

What is claimed is:

1. A flexible protective boot of the type used in rotorcraft for application over operating mechanisms or other sensitive elements including a bearing in combination with an upper control rod attachment bolt to fasten a control rod shaft to a rotor blade pitch horn, for the purpose of excluding foreign objects from the sensitive elements, said boot further having a tubular neck portion adapted to cover the shaft, a disk-like portion adapted to cover the bearing with openings through which the upper control rod attachment bolt may extend, and opposite surfaces defined as including opposite sides of a circumference of said disk-like portion and extending continuously therefrom into said neck portion, characterized by:

two slits extending through opposite surfaces of the boot, each said slit beginning at the outermost end of the neck portion and extending longitudinally inward completely through the neck portion and extending partially through the disk portion; and fastening means attached to the boot for selectively opening and re-sealing each said slit, said fastening means comprising a resealable hook and loop fastening arrangement including:

a hook portion; and a loop portion, wherein one of said portions is disposed in a fixed manner on each side of a respective said slit, and the other of said portions is disposed in a removable manner over said fixed portion for covering the respective said slit.

2. The protective boot of claim 1, wherein said hook and loop fastening means is further characterized by:

said fixed portion having a longitudinal slit which is of the same dimensions as said boot slit and which is positioned in alignment with said boot slit.

3. The protective boot of claim 1 wherein said hook and loop fastening means is further characterized by:

means for attaching said hook portion and said loop portion to the boot comprising:

stitches located along the perimeter of said fixed portion; and stitches in said removable portion located just beyond an end of said slit, the slit being on one side of said end, and the stitching being located on the other side of said end.

4. The protective boot of claim 1 wherein said hook and loop fastening means is further characterized by:

said hook portion disposed in said fixed manner on each side of said slit, and said loop portion disposed in a removable manner over said hook portion.

* * * * *